0
United States Patent Office 3,417,329
Patented Dec. 17, 1968

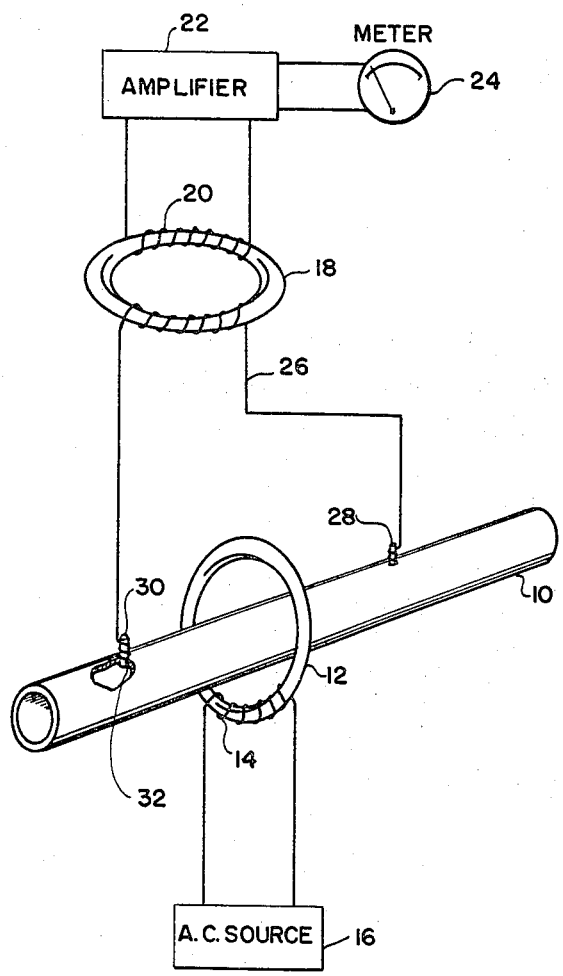

3,417,329
TOROIDAL CONDUCTIVITY MEASURING SYSTEM
David M. Landis, La Habra, and Gerald A. Rost, Yorba Linda, Calif., assignors to Beckman Instruments, Inc., a corporation of California
Filed June 25, 1965, Ser. No. 467,046
9 Claims. (Cl. 324—62)

ABSTRACT OF THE DISCLOSURE

A conductivity measuring system of the toroid type having an input toroid comprising a core and a coil located around a conduit carrying a solution whose conductivity is to be measured. An A.C. signal is applied to the coil and induces an A.C. current in the solution. Located at a distance from the solution carrying conduit so as to be substantially unaffected by the magnetic field of the input toroid is an output toroid comprising a second core and a second coil. An indicating meter is connected to the second coil while a conductor connects the second core with the solution so that the A.C. current of the solution sets up another changing magnetic field in the second core which in turn induces an A.C. current in the second coil and the meter. The last mentioned A.C. signal is a function of the conductivity of the solution.

Disclosure

This invention relates to a system for measuring the conductivity of a solution and, in particular, to a conductivity measuring system incorporating toroids, one of which is located remote from the solution.

Systems employing a pair of toroids for measuring the conductivity of solutions are of two types, namely, the immersion type and the flow-through type. In the immersion type system, a pair of insulated toroids are immersed in the solution whose conductivity is to be measured. An alternating current is supplied to the coil of one of the toroids, which is generally referred to as the input toroid, thereby inducing an alternating current in the solution. The solution functions as the secondary winding of a transformer having the coil of the input toroid as the primary winding. The coil of the second toroid, generally referred to as the output toroid, functions as the secondary winding of a second transformer having as its primary winding the sample solution. The alternating current produced in the solution by the input toroid induces an electromotive force in the output toroid which is a function of the conductivity of the solution.

In the flow-through type of toroidal conductivity system, the solution conduit is in the form of a closed loop with the input and output toroids surrounding a section of the loop. The solution in the closed loop conduit, therefore, performs the same function as the solution in the immersion type of toroidal conductivity system. In some cases, the fluid conduit in the flow-through type of conductivity system is straight with the input and output toroids surrounding the conduit and an external sample loop wire is connected to the conduit on opposite sides of the two toroids for contacting the solution in the conduit, therefore, closing the solution loop. Although the immersion and flow-through types of conductivity measuring systems have been suitable for measuring high conductivity solutions, they have had the disadvantage that they sometimes produce spurious electrical signals caused by stray fields generated by the input toroid intercepting the output toroid and also have insufficient sensitivity for measuring the conductivity of low conductivity solutions such as is required in high purity water.

It is, therefore, the principal object of the present invention to provide a toroidal-type conductivity measuring system which has higher sensitivity than presently available conductivity measuring systems and, therefore, is suitable for measuring high purity water and the like.

Another object of the invention is to provide a system for measuring the conductivity of solutions incorporating a pair of toroids in which spurious electrical signals are substantially prevented from being produced by stray fields from the input toroid intercepting the output toroid.

According to the principal aspect of the present invention, there is provided a flow-through type of conductivity measuring system incorporating input and output toroids in which only the input toroid surrounds the conduit which conveys the solution whose conductivity is being measured and the output toroid is mounted at the side of and preferably remote from the conduit. An external sample loop wire passes through an opening in the output toroid and has ends positioned in the conduit on opposite sides of the input toroid for contacting the solution passing through the conduit. A source of alternating current is connected to the input toroid and a suitable measuring means is connected to the output toroid. Since the output toroid is positioned to the side of or remote from the solution conduit, rather than surrounding the conduit, there is a substantial reduction in the pickup of stray fields generated by the input toroid over those systems in which both toroids surround the sample conduit. Also, according to another feature of the invention, the external sample loop wire passes through the output toroidal core and preferably is wound thereon, thus increasing the output of the output toroid. Consequently, the system of the present invention is capable of measuring lower conductivity solutions than can be measured by existing toroidal-type conductivity systems.

Other objects, aspects and advantages will become apparent from the following description taken in connection with the accompanying drawing wherein there is illustrated a schematic view of the invention.

Referring now to the drawing in detail, there is shown a conduit 10 formed of a non-conductive and non-magnetic material, such as glass or polyethylene, through which the sample solution whose conductivity is to be measured passes. A toroidal core 12 surrounds the conduit 10 and has wound thereon a toroidal coil 14 which is connected to a source of alternating current 16. The coil 14 and core 12 constitutes the input toroid of the system.

A second toroidal core 18 is positioned remote from the conduit 10 rather than surrounding the conduit as does the core 12. A second toroidal coil 20 is wound about the core 18 and together constitute the output toroid of the system. The coil 20 is connected through an amplifier 22 to a meter 24 for indicating the electromotive force induced in the coil 20 in a manner described later.

An external sample loop wire conductor 26 passes through the opening of the core 18 and has its ends connected to metal posts 28 and 30 embedded in the conduit 10 as shown at 32 in the drawing where a portion of the conduit 10 is broken away to show that the posts 28 and 30 are disposed so as to contact the solution in the conduit 10. It is to be understood that the metal posts 28 and 30 are metallic solution contacts and do not function as have electrodes in the prior art in the measurement of the conductivity of the solution. In prior art conductivity cells a voltage from a source is directly impressed upon the electrode whereas contact posts 28 and 30 simply offer electrical communication paths for a current induced in the solution.

The above-described system may be considered to constitute a pair of transformers. The input toroidal coil 14 is the primary winding of a first transformer having a core 12 while the conduit 10 together with the external sample loop wire 26 constitute the secondary winding of the first transformer and also the primary winding of a second transformer having as its secondary winding the output toroidal coil 20.

In operation of the system, when an alternating current is supplied to the input toroid coil 14, a changing magnetic field is set up in the core 12 which in turn induces an alternating current in the solution passing through the conduit 10. This alternating current is communicated through wire 26 to set up a changing magnetic field in the core 18 which in turn induces an electromotive force or current in the coil 20 which is a function of the conductivity of the solution. This electromotive force or current is amplified by the amplifier 22 and is indicated on the meter 24.

It is preferred that the core 18 and coil 20 be positioned sufficiently remote from the conduit 10 and solution therein so that they are effectively outside the magnetic field produced by the input toroidal coil 14 on the core 12. By this arrangement, the spurious voltages normally caused by stray fields generated by the input toroid or input cabling intercepting the output toroid are substantially eliminated without requiring shielding, which is not possible by the conventional flow-through toroidal conductivity systems in which the input and output toroids are positioned close together in coaxial relationship about the sample carrying conduit. The sensitivity of the system of the invention may also be increased by increasing the number of loops of the wire 26 wound about the core 18. A system constructed in accordance with the invention and in which there was provided a multiplicity of loops of the sample loop wire 26 about the core 18 had a 30 micro-mho full scale sensitivity, which is about 30 to 100 times greater sensitivity than obtained by conventional toroidal type conductivity systems.

Although the system is shown as being continuous, that is, the sample solution flows through the conduit 10, it is to be understood that the invention is applicable to batch analysis which would merely require that the conduit 10 be vertically disposed and provided with means for closing the lower end thereof.

Although only one embodiment of the invention has been disclosed herein for purposes of illustration, it will be understood that various changes can be made in the form, details, arrangement and proportions of the various parts in this embodiment without departing from the spirit and scope of the invention as defined by the appended claims.

What is claimed is:

1. A system for measuring the conductivity of a solution comprising:
    a conduit of nonconductive material for containing said solution;
    means for inducing an alternating current in the solution in said conduit;
    toroid means positioned remote from said conduit and said solution;
    a conductor electrically communicating with said toroid means and in contact with the solution in said conduit, whereby an electromotive force may be induced in said toroid means which is a function of the alternating current in the solution and, therefore, the conductivity of the solution; and
    means electrically communicating with said toroid means for indicating the conductivity of the solution.

2. A system for measuring the conductivity of a solution comprising:
    a conduit of nonconductive material for containing said solution;
    means for inducing an alternating current in the solution in said conduit;
    toroidal core means positioned remote from said conduit;
    coil means wound about said toroidal core means;
    a conductor wound about said toroidal core means and in contact with the solution in said conduit, whereby an electromotive force may be induced in said coil means which is a function of the alternating current in the solution and, therefore, the conductivity of the solution; and
    means connected to said coil for indicating the conductivity of the solution.

3. A system for measuring the conductivity of a solution comprising:
    a conduit of nonconductive material for containing said solution;
    first toroid means concentric with said conduit for inducing an alternating current in the solution in said conduit;
    second toroid means positioned remote from said conduit and said solution;
    a conductor in electrical communication with said second toroid means and having ends disposed on opposite sides of said first toroid means so as to contact the solution in said conduit, whereby an electromotive force may be induced in said second toroid means which is a function of the alternating current in the solution and, therefore, the conductivity of the solution; and
    means electrically communicating with second toroid means for indicating the conductivity of the solution.

4. A system for measuring the conductivity of a solution comprising:
    a conduit of nonconductive material for containing said solution;
    first toroid means concentric with said conduit for inducing an alternating current in the solution in said conduit;
    second toroid means positioned remote from said conduit;
    a conductor electrically communicating with said second toroid means and having ends disposed on opposite sides of said first toroid means so as to contact the solution in said conduit, whereby an electromotive force may be induced in said second toroid means which is a function of the alternating current in the solution and, therefore, the conductivity of the solution; and
    means electrically communicating with said second toroid for indicating the conductivity of the solution.

5. A system for measuring the conductivity of a solution comprising:
    a conduit of nonconductive material for containing said solution;
    a first toroidal core concentric with said conduit;
    an input coil wound on said first toroidal core for receiving an input signal to set up a changing magnetic field in said core whereby an alternating current is induced in said solution in said conduit;
    a second toroidal core positioned remote from said conduit;
    an output coil wound on said second toroidal core;
    a conductor wound on said second toroidal core and having ends disposed on opposite sides of said first toroidal core and input coil so as to contact the solution in said conduit whereby an electromotive force may be induced in said output coil which is a function of the alternating current in the solution and, therefore, the conductivity of the solution; and
    means connected to said ouput coil for indicating the conductivity of the solution.

6. A system as set forth in claim 5 wherein said second toroidal core and output coil are positioned outside the environment being substantially affected by the magnetic field set up by said input coil.

7. A system as claimed in claim 1 wherein said toroid means comprises:
a toroidal core; and
a coil wound about said core.

8. A system as claimed in claim 1 wherein said means for inducing an alternating current in the solution is disposed about the conduit; and
said conductor having ends contacting the solution on opposite sides of said means for inducing an alternating current in the solution.

9. A system as claimed in claim 1 wherein:
said toroid means comprises a toroidal core and a coil wound about said core, said means for inducing an alternating current in the solution is a second toroidal core and a second coil wound about said second core;
said conductor having ends contacting the solution on opposite sides of said second core and said second coil.

References Cited

UNITED STATES PATENTS 2,709,785  5/1955  Fielden.

ARCHIE R. BORCHELT, *Primary Examiner.*

C. F. ROBERTS, *Assistant Examiner.*

U.S. Cl. X.R.

324—30, 64